Patented Oct. 9, 1945

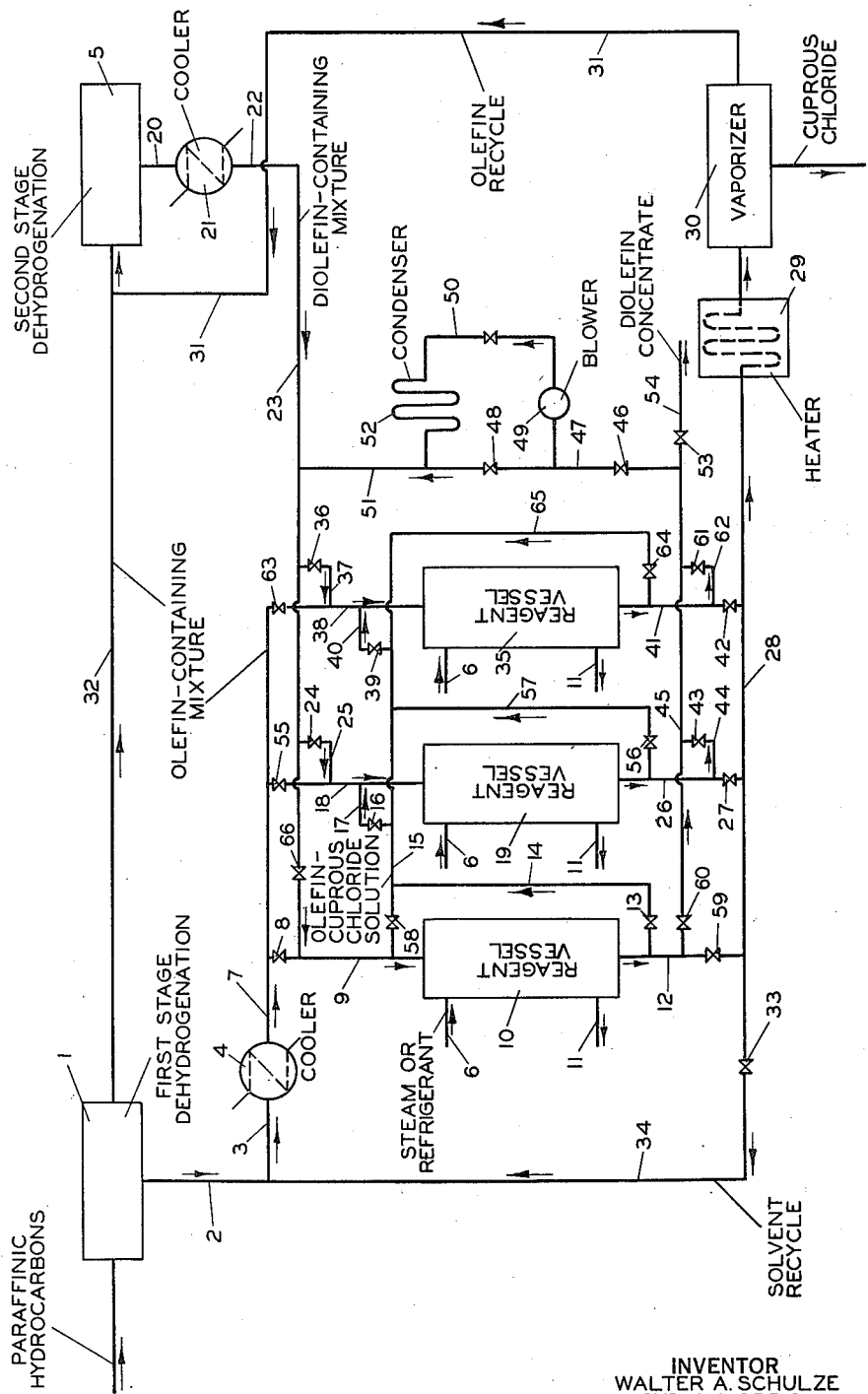

2,386,355

UNITED STATES PATENT OFFICE

2,386,355

PROCESS FOR PRODUCTION OF DIOLEFINS

Walter A. Schulze and Lloyd C. Morris, Bartlesville, Okla., assignors to Phillips Petroleum Company, a corporation of Delaware Application November 7, 1941, Serial No. 418,263

17 Claims. (Cl. 260—681.5)

This invention relates to a process for the treatment of hydrocarbon mixtures containing diolefins for the separation and recovery of said diolefins. More specifically it relates to an improved cyclic process for the separation and recovery of diolefins from hydrocarbon mixtures through a novel application of cuprous halide reagent solutions in miscible non-aqueous solvents.

The synthesis of diolefins of four, five or more carbon atoms from the corresponding paraffins by dehydrogenation and the like involves the intermediate production of olefins which are in turn converted to diolefins. These olefins may or may not be segregated, but the mechanism of diolefin synthesis is such that diolefins are produced from and occur in mixtures containing considerable amounts of olefins of corresponding structure along with unconverted paraffins. Other components of diolefin-containing mixtures are paraffins and olefins of a smaller and/or a larger number of carbon atoms, depending on the distillation range of said mixtures. Similarly, when olefins are the starting material for the synthesis of diolefins, the diolefin-containing mixtures have comparable complex compositions.

In the separation and recovery of diolefins, use is sometimes made of the reaction between conjugated diolefins and inorganic metal salts, particularly salts of metals of group I of the periodic system, and more particularly of cuprous halides, to form addition complexes of the general formula $(MX)_x \cdot C_n H_{2n-2}$. Such addition complexes are relatively insoluble in the hydrocarbon mixtures, and may be dissociated by simple treatment such as moderate heating to recover the metal salt and the diolefin.

However, in bringing about the above-mentioned reaction for the separation of diolefins, certain factors add greatly to the difficulties encountered in securing efficient and rapid reaction and in recovering a satisfactorily pure product. These factors include the insolubility of the preferred cuprous salts in water and most ordinary solvents, and the instability and corrosiveness of aqueous cuprous salt solution prepared with the aid of solutizing agents.

Further, reaction between such immiscible solutions and hydrocarbon gases and liquids is slow, and mechanical difficulties are introduced by the precipitation of the solid diolefin complex in the reagent solution. Finally, extraneous fluids and hydrocarbons other than diolefins are retained by the reagent solutions and the solid complex so that the purity of the recovered diolefin is adversely affected.

It is an object of this invention to provide an improved process for the separation of diolefins from hydrocarbon mixtures.

It is a further object of this invention to provide new and improved methods for preparing cuprous halide reagent solutions.

Another object is to provide a process for diolefin separation in which a cuprous halide is first dissolved to form a reagent, and later deposited as a solid in a convenient manner for further use.

Another object of this invention is to provide a cyclic process for the separation of relatively low-boiling aliphatic diolefins from hydrocarbon mixtures with improved reaction conditions and more efficient recovery of the diolefins.

Another object is to provide such a cyclic process in which a cuprous halide is carried in a solvent comprising a relatively low-boiling aliphatic olefin derived from a first hydrocarbon conversion step, said solvent being later passed to a second conversion step for the production of diolefins.

Other objects and advantages of this invention will be apparent from the following detailed description.

We have discovered that the efficiency of cuprous halide reagents for diolefin separation may be greatly increased and their use simplified by preparing solutions of the same in certain miscible hydrocarbon solvents comprising olefins. The preparation and use of these solutions are disclosed in our copending application, Serial No. 418,264, filed November 7, 1941. The co-pending application of Harry E. Drennan and Walter A. Schulze, Serial No. 418,262, filed November 7, 1941, discloses various processes and operating details for the use of said solutions. We have established the solvent capacity for cuprous chloride of the hydrocarbon mixtures which are most readily available in the synthesis of diolefins from the corresponding paraffins and/or olefins. Further, we have devised a scheme of cyclic continuous operation by integration of our diolefin separation process with certain diolefin manufacturing processes so as to obtain outstanding efficiency and economy in operation.

We have found that olefins which customarily are present in charging stocks to dehydrogenation processes for the manufacture of diolefins are effective solvents for cuprous halides. Further, since the diolefin-containing products from said processes contain many of the same olefins, said products are sources of the solvents we find useful in preparing cuprous halide reagent solutions. The solvent action of the hydrocarbon liquid for cuprous halides may be attributed to physical solubility or to the more likely circumstances of the formation of an olefin-cuprous halide complex which differs from the diolefin-cuprous halide complex in being relatively soluble in the hydrocarbon liquid. With knowledge of the solvent capacity of various olefin and/or olefin-paraffin mixtures, we are able to operate our process for the separation of diolefins in connection with either one-stage or two-stage dehydrogenation processes for the manufacture of diolefins and to combine said operations to increase the efficiency of the diolefin separation and recovery steps.

We have discovered that the solubility of cuprous halides in olefinic hydrocarbons and/or in mixtures thereof varies widely with the individual hydrocarbon and that the solvent capacity of olefinic mixtures can be estimated accurately from the composition. We have further established the relationship between solubility and temperature for various olefinic mixtures and thus have outlined greatly improved methods of operation for the separation of diolefins. Said methods of operation involve the preparation of solutions of cuprous halide reagents in olefinic hydrocarbons, and the addition of said solutions to liquids containing diolefins under conditions which cause reaction and the formation of the diolefin addition complex. We have also provided novel methods of separating said diolefin addition complex and recovering diolefins therefrom in a cyclic process. Cuprous chloride has been found to be very satisfactory although other cuprous halide, for instance the bromide, may be used.

When applied in conjunction with a two-stage dehydrogenation process to prepare diolefins from paraffin hydrocarbons using cuprous chloride as the diolefin separating agent, our process embodies the following operations: (1) suitable mixtures from the first dehydrogenation stage comprising paraffins, olefins and sometimes diolefins are passed at the proper temperature and flow rate through a reagent chamber or vessel containing cuprous chloride and a solid dispersing agent and/or filter aid to prepare a solution of cuprous chloride; (2) the resulting solution is mixed with a diolefin-containing liquid from the second dehydrogenation stage in a second reagent chamber or vessel which contains a solid dispersing agent and may also contain cuprous chloride; (3) the diolefin-cuprous chloride addition complex formed is deposited and filtered from the hydrocarbon mixture; (4) the flow of hydrocarbon liquid is stopped, the said second vessel is emptied of unreacted hydrocarbons and the addition complex is dissociated by heat with the cuprous chloride remaining on the adsorbent material while the diolefin is taken off in substantially pure form.

The sequence of operations may be better understood by the drawing which illustrates one arrangement of equipment for a specific embodiment of the invention. It will be understood that the various compressors, pressure regulating valves, etc. needed for the process are not shown for the sake of simplicity, the use being obvious, in accordance with conditions as described in various parts of the system. Ordinarily the material being processed, when described as being liquid, is under just sufficient pressure to maintain it in the liquid phase, although somewhat higher pressures may be used, especially to care for the pressure drop through reagent beds.

In the drawing, unit 1 represents a first stage dehydrogenation step in which paraffin hydrocarbons are converted to olefins along with a relatively small quantity of diolefins, and this unit, as well as unit 5 hereinafter described, ordinarily includes means for cooling, compressing, and fractionating the effluent from the dehydrogenation reaction zone to remove light gases including hydrogen, etc., and material appreciably heavier than the starting material, giving a liquid of fairly narrow boiling range containing substantial quantities of olefins. As disclosed in our copending application mentioned above, certain olefins, namely butene-1, the normal pentenes, and hexene-1, are preferred solvents for cuprous chloride in that they exhibit much greater solvent power than other readily available olefins. Accordingly, an important feature of our present invention is fractionation or other treatment of the material in the first and/or second dehydrogenation stages, 1 and/or 5, to concentrate or segregate prefered olefins for use as solvents for cuprous chloride, thus reducing the required volume of solvent. However, the cost of the segregation steps must be weighed against the advantages of increased solvent power, and the optimum solvent in any particular case will depend upon the available hydrocarbon streams containing olefins, and the economic factors involved. In any case, the solvent capacity of the liquid solvent is based on the content of the various olefins present therein, the paraffinic hydrocarbons being substantially inert with respect to any solvent action on cuprous halides.

The olefinic material not needed for use as a solvent passes to the second stage dehydrogenation unit 5 through line 32. The remainder of the liquid is taken through lines 2 and 3 and cooler 4 into manifold line 7 which serves the reagent vessels 10, 19 and 35. By opening valve 8, the cooled liquid flows through line 9 into vessel 10 filled with a cuprous halide, preferably cuprous chloride, and an adsorbent dispersing agent. Vessels 10, 19 and 35 are fitted with heating and cooling means, for example, by circulation of heating or cooling media in indirect heat exchange, illustrated on each vessel by inlet 6 and outlet 11, which may be utilized at the proper stages of the cycle of operations, as will be more fully explained. The olefinic liquid in passing through the reagent becomes saturated with cuprous chloride, and leaves through line 12, valve 13 and line 14 to manifold line 15. At the same time the diolefin-containing hydrocarbon liquid produced in unit 5 is taken through line 20, cooler 21 and line 22 into manifold 23. This liquid enters line 18 through valve 24 and line 25, while the cuprous chloride solution enters line 18 through valve 16 and line 17. The two liquids are mixed in passing into vessel 19, and the solid diolefin addition complex formed is precipitated in and retained by the adsorbent material in vessel 19. The solid-free liquid mixture exits through line 26 and valve 27 into manifold 28. From this manifold the flow may be divided to recycle a portion of the liquid through valve 33 and line 34 to the solvent line 3, while the remainder passes through heater 29 which is interposed in line 28 and vaporizer 30 to line 31. Or if this solvent recycle is not desired, the entire stream passes through the vaporizer as charge stock for the second dehydrogenation stage. The vaporizer retains any unreacted cuprous chloride which may be dissolved in the liquid from line 28, and the vapor passes through line 31 to line 32, which is the feed line to the second dehydrogenation unit 5. Of course, cuprous chloride deposited in vaporizer 30 may be removed from the system or returned to the reagent vessels by suitable means.

When the reagent in vessel 19 has received a suitable amount of solid diolefin addition complex, the flow of the liquid mixture into the vessel is stopped and the function of vessel 19 is continued in vessel 10. This is done by closing valves 8, 13, 16, 24, and 27 and opening valves 58, 59, 63, 64, and 66. The olefinic solvent then flows through valve 63, and line 38 into vessel 35. The cuprous chloride solution resulting then passes through line 41, valve 64, line 65, line 15 and valve 58 into line 9. Therein it is mixed with the diolefin-containing liquid entering from manifold 23 through valve 66. The liquid streams mix in passing into vessel 10, and the cuprous chloride-diolefin complex is formed and retained therein. The liquid effluent from vessel 10 exits through line 12, valve 59 and line 28 with a portion, if desired, being returned as solvent recycle through valve 33 and line 34. In this particular scheme of operation, the service cycle of the reagent vessels is arranged to return to a vessel the cuprous chloride removed in preparing the reagent solution by next using said vessel to receive the diolefin complex.

The diolefin is then recovered from the reagent in vessel 19 by a series of operations, beginning with removal of the liquid remaining in the vessel. This liquid may be removed while the internal temperature of the vessel is rising to force the same out through line 26, valve 43 and line 44 into manifold 45. The liquid then passes through valve 46, line 47, valve 48 and line 51 back into the manifold 23. When the liquid is withdrawn, valve 48 is closed, and blower 49 is started to provide sub-atmospheric pressures within vessel 19, and the hydrocarbon vapors pulled from the vessel are passed through line 50, condenser 52 and line 51 into manifold 23. During the evacuation period the temperature within vessel 19 may rise to about 80 to 110° F., but should go no higher; this facilitates the removal of traces of extraneous gases and hydrocarbons remaining in the vessel.

At this point, valve 46 is closed and vessel 19 is heated to temperatures sufficient to dissociate the diolefin addition complex. The substantially pure diolefin is removed through valve 53 and line 54 to storage. The cuprous chloride residue remains in place on the adsorbent material in vessel 19 for further service in the process. Vessel 19 may then be used to prepare the cuprous chloride reagent solution or to receive further deposits of diolefin addition complex.

While the process has been illustrated with a system containing three reagent vessels, it will be apparent that the number of vessels and the sequence of operations may be adjusted to fit the requirements of a particular installation. Also, the period of use of each tower in preparing the reagent solution and receiving the diolefin addition complex may be arranged according to the amounts of cuprous halide present in the vessels and the diolefin content of the mixture produced in the second dehydrogenation stage.

The direction of flow of the hydrocarbon liquids through the reagent beds may be varied to suit the conditions of operation or according to the service of the reagent towers. Thus, it may be desirable to reverse the flow through the beds in separate cycles, or to maintain upward flow through the tower furnishing the cuprous chloride solution and downward flow through the tower collecting the diolefin complex. These and similar modifications are possible with the flexibility of operation described.

While the above-described procedure for removing liquid and vapor from the reagent towers prior to desorption is highly satisfactory, other methods such as sweeping out the towers with warm inert and/or non-condensible gases may be employed with good results.

The composition of the hydrocarbon liquid mixtures produced and used in a process of the type described will depend on the feed stocks and the extent of conversion in the two stages of dehydrogenation. For example, when treating n-butane to produce butadiene, the product of the first stage after more or less complete separation of material higher and/or lower boiling than $C_4$ hydrocarbons may comprise unconverted butane, butenes and some butadiene with ratio of unsaturates to saturated hydrocarbons varying with the extent of conversion and the efficiency of the catalyst. Such an operation may also involve a separation of the unconverted paraffins by means of solvent extraction and the like for recycle to the first stage of dehydrogenation, and in this case the liquid mixture from said first stage handled by our process essentially consists of unsaturated hydrocarbons with a high ratio of olefins to diolefins. As hereinbefore described, further concentration to give a high percentage of preferred olefins may be resorted to. In any case, considerable amounts of cuprous chloride will be dissolved by the liquids and the solutions thus prepared may be utilized efficiently in our process. The diolefins present in the product of the first stage dehydrogenation will be precipitated out in the reagent vessel as a complex with cuprous chloride, and will be recovered after the vessel has been utilized as the reagent vessel in the next cycle along with diolefins from the complex precipitated during that cycle.

Similarly, the diolefin-containing liquid produced by the second stage of dehydrogenation after more or less complete separation of lower-boiling gases and heavy materials will contain both olefins and diolefins with a lower olefin to diolefin ratio than the product of the first stage. When lower-boiling hydrocarbons are employed as diluents, as for example when propane and/or propylene are used along with $C_4$ hydrocarbons in the production of butadiene, these may be retained in the mixtures to be used in our process, but ordinarily do not greatly increase the solubility of the metal salt, and require higher pressures to prevent vaporization. Thus, while the total condensate from either dehydrogenation stage may be handled by our process, we ordinarily prefer to treat rather closely fractionated mixtures.

We have found that the weight of cuprous chloride which can be dissolved in a hydrocarbon liquid mixture containing $C_4$ unsaturates depends upon the butene content, and that the rate of formation of the insoluble diolefin-cuprous chloride complex is greatly increased by having the inorganic reactant in solution in the hydrocarbon liquid. Our process therefore provides for utilization of the olefin content of the first dehydrogenation stage as solvent for the separation of diolefin from both stages. Where larger volumes of solvent are desirable, the internal recycle of our process provides for the recirculation of whatever volume of the olefin-containing liquid is required to maintain the olefin-diolefin ratio at the optimum level during the steps of our process. Of course the features of this invention are also applicable to the treatment of the products from single-stage conversions, in which case the olefin-containing liquid solvent may be derived either partially or wholly from the olefins produced in the single stage conversion, recycle of olefins being provided in whatever amount is desirable. Furthermore, certain features of our invention may be utilized in separating diolefins from any mixture, using olefins from any source, which source may or may not be a diolefin-containing mixture.

When the olefin-containing solvent liquid is passed through the cuprous chloride reagent, maximum solution of the inorganic salt is obtained at temperatures between about −30 and about +80° F. We have found that precipitation of cuprous chloride from saturated butene solutions usually occurs at temperatures outside of this range; therefore, while higher or lower temperatures may be used, the efficiency of the process is thereby decreased. A preferred temperature range is between 10 and 60° F., since the subsequent precipitation of the diolefin complex is favored by temperatures below about 60° F. The cooled liquid is passed through the cuprous chloride reagent bed at flow rates which provide adequate contact for the formation of substantially saturated solutions, usually between 0.5 and 5 liquid volumes of hydrocarbon per volume of reagent per hour.

The liquid hydrocarbon stream from the second dehydrogenation stage is taken into our process after cooling to a temperature level which insures final mixture temperatures within the reagent bed in the range of −30 to +80° F., but preferably in the range of about 10 to 60° F. The extent of such cooling will depend on the relative volume and temperature of the cuprous chloride solution with which the second stage liquid is mixed just prior to passage into the reagent vessel receiving the subsequently precipitated diolefin complex. Intimate mixing of the two streams at the inlet to the reagent vessel promotes the formation of the substantially insoluble complex which is then removed from the liquid hydrocarbons and retained on the reagent bed.

The formation and separation of the diolefin-cuprous chloride complex are completed within the reagent vessel serving as a reaction chamber and the liquid effluent is free of solid material. When the streams have been properly proportioned ahead of the reaction chamber, the liquid effluent will be substantially free of both unreacted cuprous chloride and diolefin. However, in view of the subsequent handling of said effluent, there is sufficient flexibility in the process to allow adjustment of its operation to conform to any desired set of conditions.

The portion of the effluent being recycled to serve as solvent for cuprous chloride may be immediately returned without further treatment. However, the portion which represents the feed stock to the second dehydrogenation stage is ordinarily heated and flashed or chemically treated to remove residual copper salts. This operation may be carried out by any convenient means allowing good separation of the inorganic residue.

The cycle of operations for the reagent towers may be timed to conform to the weight of cuprous chloride in the reagent beds or to the weight of cuprous chloride-diolefin complex which it is desirable and/or feasible to collect in the so-called reaction tower. In this latter connection, such variables as pressure drop through the reaction tower and/or the efficiency of solid separation from the liquid stream may be the controlling factors in determining the time period of each reagent tower in each service of the cycle.

When it is desired to recover the diolefin separated in the form of the cuprous chloride complex, the unreacted hydrocarbon liquid is removed as completely as possible from the reagent vessel containing the complex. This may be accomplished by a pump or by allowing the temperature of the vessel to rise sufficiently to generate pressure to force out said liquid. When the liquid has been removed, the vessel is freed of adsorbed liquid and/or vapors by evacuation or sweeping with an inert non-condensible gas or the like. This removal of residual liquid and/or vapors is preferably carried out at atmospheric temperatures or at about 80 to 110° F., depending on the pressure, and on the decomposition temperatures of the particular diolefin complex.

After substantially all the hydrocarbons exclusive of the chemically combined diolefins have been removed, the diolefin is evolved by continued heating, in the case of butadiene at a temperature in the range of about 140 to 210° F. or above, depending on the pressure. Lower temperatures within this range may be employed in conjunction with sub-atmospheric pressures in the diolefin collection system.

While our cuprous chloride reagent may be prepared and arranged in a number of satisfactory ways, we have obtained excellent results using granular, powdered, or pelleted cuprous chloride or intimate mixtures of cuprous chloride with a solid adsorbent carrier of such particle size that a permeable yet uniform composition results. Thus, we may use a suitable particle size of cuprous chloride or mix powdered cuprous chloride with such materials as charcoal, pumice, fuller's earth, bauxite, silica gel, diatomaceous earth and the like, of suitable mesh size to avoid settling and/or packing of the cuprous salt. The proportions of such mixtures may vary considerably with the cuprous chloride usually predominating because of its greater density and amounting to 50 to 80 weight per cent or more of the reagent. Other means of preparing the reagent such as making slurries of the cuprous chloride with liquids for preparing granular reagents or for mixing with the carriers may be employed successfully. Such slurries should be substantially freed of water and/or reactive liquids prior to use.

The reagent is arranged in beds of such dimensions that the time of contact of hydrocarbon liquids with the reagent may be sufficiently prolonged but without incurring excessive resistance to flow. The reagent beds may contain conduits for heating and cooling media, or the reagent itself may be contained in tubes of relatively small diameter around which the heating and cooling media may be circulated. Another possible arrangement is to place the reagent on a series of trays within the reagent vessel and to obtain in effect a series of reagent beds of limited depth but very well adapted to separating and retaining the diolefin complex from the hydrocarbon liquid. In this arrangement, excellent results are obtained with reagents prepared from or placed on materials such as diatomaceous earth, or similar filter aids. The principal separation requirements are to provide for removal of the complex from the liquids without incurring too great a pressure drop, and to cause cuprous halide to be released from the complex for further use. This may even be accomplished in the absence of carriers by such means as filtration if the stated requirements are met.

The following example will serve to illustrate one embodiment of our invention:

*Example*

A two-stage dehydrogenation unit producing butadiene from n-butane produced from the first stage a $C_3$—$C_4$ mixture containing approximately 95 per cent of unsaturates including propylene, n-butenes, and a small amount of butadiene. This liquid was cooled to 30° F. and passed together with recycled $C_3$—$C_4$ liquid from the process at a flow rate of 0.5 liquid volume per hour per volume of reagent over a cuprous chloride reagent. The reagent consisted of an intimate mixture of powdered cuprous chloride with 30 to 60 mesh fuller's earth containing about 80 per cent by weight of the cuprous salt. The liquid from this first reagent was saturated with cuprous chloride and was injected into the inlet line of a second reagent tower through which was passing a cooled stream of liquid $C_3$—$C_4$ mixture from the second dehydrogenation stage.

The liquid $C_3$—$C_4$ mixture from the second dehydrogenation stage contained 5 to 7 volume per cent of butadiene, and after mixing with approximately two volumes of the cuprous chloride-hydrocarbon solution and passing through the second reagent tower, the liquid was substantially free of butadiene. The temperature in the second tower was 35° F. and the flow rate through the reagent bed was about 1.5 liquid volumes per hour per volume of the reagent bed.

The effluent from the second reagent tower (reaction tower) was divided with part being recycled to the stream through the first reagent tower to prepare cuprous chloride solution while the balance was heated and flashed in a vaporizer to drop out traces of unreacted cuprous chloride. The vapors were then charged to the second dehydrogenation unit for further conversion to butadiene.

When the quantity of butadiene-cuprous chloride complex accumulated in the second reagent tower reached the calculated capacity of the beds at a maximum pressure drop of 20 pounds per square inch through the bed, the flow of reactants was switched and the first tower became the reaction tower to receive the butadiene complex, with a third tower serving to prepare the cuprous chloride solution. The tower containing the complex was then pumped free of liquid hydrocarbons and was held at substantially atmospheric pressure and a temperature of about 100° F. while adsorbed uncombined hydrocarbons were removed. The temperature of the reagent bed was then raised slowly to 200° F. and butadiene vapors were evolved and taken to a condenser and to storage. The purity of the butadiene recovered was about 99 per cent.

The cycle of operations was continued according to the scheme outlined, and from the next tower desorbed, the butadiene recovered represented that removed from the second stage liquid plus that contained in the liquid from the first stage of dehydrogenation during the previous cycle.

Substantially equivalent results were obtained in the operations described in the example when the following reagents were employed:

(a) Small porous granules of cuprous chloride prepared by wetting, compacting, and drying the powdered material.

(b) A mixture of cuprous chloride and diatomaceous earth of similar particle size.

While the foregoing description is relatively specific to the use of cuprous chloride in the treatment of butadiene-containing liquid hydrocarbons produced by two-stage catalytic dehydrogenation, the scope of the invention permits the application of cuprous halides to butadiene and butene-containing liquids produced from other sources such as those occurring in the thermal conversion of higher and/or lower-boiling hydrocarbons. Also, with necessary modifications the process may be applied to other conjugated diolefins such as those of five or more carbon atoms, for instance isoprene and piperylene, and may include the use of olefins of a different number of carbon atoms from the diolefins being separated, by proper variations in operating conditions, hydrocarbon segregation steps, etc.

The term "solid cuprous halide reagent" as used herein is to be construed broadly, in view of the foregoing disclosures, to include such a reagent in any state, depending upon its particular location in the cycle of operations. Thus, it may include a carrier, or may consist of cuprous halide alone. Further, the cuprous halide content of a zone said to contain a reagent may vary from the upper limits disclosed down to practically zero, in accordance with the amount of cuprous halide which has been dissolved out by olefins, or the amount of complex which has been deposited therein at any particular time.

We claim:

1. A process for the separation of diolefins from mixtures containing the same which comprises contacting an olefin-containing liquid with a solid cuprous halide reagent to form a solution of cuprous halide in said liquid, contacting said solution with a diolefin-containing mixture and thereby forming an insoluble cuprous halide-diolefin complex, depositing said complex on a carrier, and decomposing said complex on said carrier to liberate diolefins therefrom and deposit cuprous halide on said carrier.

2. A process according to claim 1 in which the carrier having cuprous halide deposited thereon by decomposition of the diolefin complex is utilized as the solid cuprous halide reagent with which the olefin-containing liquid is contacted.

3. A process for the separation of diolefins from mixtures containing the same which comprises contacting an olefin-containing liquid with a solid cuprous chloride reagent to form a solution of cuprous chloride in said liquid, contacting said solution with a diolefin-containing mixture and thereby forming an insoluble cuprous chloride-diolefin complex, depositing said complex on a carrier, decomposing said complex on said carrier to liberate diolefins therefrom and deposit cuprous chloride on said carrier, and utilizing the thus-formed mixture of cuprous chloride and carrier as the solid cuprous chloride reagent with which the olefin-containing liquid is contacted.

4. A process for the separation of diolefins from mixtures containing the same which comprises contacting an olefin-containing liquid with a solid cuprous halide reagent to form a solution of cuprous halide in said liquid, contacting said solution with a diolefin-containing mixture in the presence of cuprous halide reagent thereby forming an insoluble cuprous halide-diolefin complex in the presence of olefin-cuprous halide solution, separating said complex from the olefin-cuprous halide solution, and contacting the separated olefin-cuprous halide solution with additional diolefin-containing mixture to form insoluble cuprous halide-diolefin complex.

5. A process for the separation of butadiene from mixtures containing the same which comprises passing an olefin-containing liquid through a first zone containing a solid cuprous halide reagent to form a solution of cuprous halide in said liquid, mixing said solution with a butadiene-containing liquid in a second zone also containing a solid cuprous halide reagent thereby forming an insoluble cuprous halide-butadiene complex which is separated from the liquids and retained in said second zone, then substituting for said first zone a third zone containing a solid cuprous halide reagent while substituting said first zone for said second zone, removing fluids from the second zone, heating the contents of said second zone to a temperature sufficient to recover butadiene therefrom and to deposit cuprous halide therein, and finally returning said second zone to service in the cycle of operations.

6. A process for the separation of diolefins from mixtures containing the same which comprises passing a hydrocarbon liquid comprising olefins through a first zone containing solid cuprous chloride reagent to form a solution of cuprous chloride in said hydrocarbon liquid, mixing said solution with a diolefin-containing liquid in a second zone thereby forming an insoluble cuprous chloride-diolefin complex which is retained in said second zone and thereby separated from the liquid, then substituting for said first zone a third zone containing solid cuprous chloride reagent while substituting said first zone for said second zone, removing fluids from the second zone, heating the contents of said second zone to a temperature sufficient to recover diolefins therefrom and to deposit cuprous chloride in said zone, and finally re-introducing said second zone in the cycle of operations.

7. A process according to claim 6 in which the hydrocarbon liquid comprising olefins contains a substantial proportion of butene-1.

8. A process according to claim 6 in which the hydrocarbon liquid comprising olefins contains a substantial proportion of a normal pentene.

9. A process according to claim 6 in which the hydrocarbon liquid comprising olefins contains a substantial proportion of hexene-1.

10. A process for the separation of butadiene which comprises passing a butenes-containing liquid at temperatures in the range of −30 to +80 F. through a first zone containing a solid cuprous chloride reagent to form a solution of cuprous chloride in said liquid, mixing said solution with a butadiene-containing liquid in a second zone containing a solid cuprous chloride reagent at temperatures in the range of −30 to +80 F. thereby forming an insoluble cuprous chloride-butadiene complex which is separated from the liquids and retained in said second zone, subsequently interrupting the flow of liquids through said first and second zones, replacing said first zone with a third zone containing a solid cuprous chloride reagent and substituting said first zone for said second zone, resuming the flow of liquids through said third and first zones respectively, removing liquids and vapors from the second zone, heating the complex remaining in said second zone to a temperature sufficient to recover butadiene therefrom and to deposit cuprous chloride in said zone, and finally returning said second zone to service in the cycle of operations described.

11. A process for the separation of low-boiling aliphatic diolefins from a liquid hydrocarbon mixture containing the same together with low-boiling aliphatic olefins which comprises passing a stream of said liquid hydrocarbon mixture previously freed of diolefins by the said process over a solid cuprous halide reagent contained in a first chamber to effect solution of the cuprous halide, mixing the solution thus prepared with the diolefin-containing liquid in a second chamber containing a solid cuprous halide reagent whereby a reaction occurs to precipitate the diolefins as a solid cuprous halide addition product which is separated from the liquids and retained in said second chamber, returning a portion of the solid-free olefin-containing liquid to the first chamber as a solvent, subsequently interrupting the flow of liquids through said first and second chambers, transferring the function of said first chamber to a third chamber containing a solid cuprous halide reagent while transferring the function of said second chamber to said first chamber, removing fluids from the second chamber, treating the contents of said second chamber to recover diolefins therefrom and to deposit cuprous halide in said chamber, and finally returning said second chamber to service in the cycle of operations.

12. A process for the production of diolefins from olefin-containing hydrocarbons which comprises passing said olefin-containing hydrocarbons in the liquid phase through a first zone containing a solid cuprous halide reagent to form a solution of cuprous halide in said hydrocarbon liquid, mixing said solution with a stream of diolefin-containing hydrocarbons from a hydrocarbon conversion region in a second zone containing a solid cuprous halide reagent thereby forming an insoluble cuprous halide-diolefin complex which is separated from the liquids and retained in said second zone, removing residual cuprous halide from the olefin-containing effluents of said second zone and passing said effluents to said hydrocarbon conversion region for the further production of diolefins, subsequently interrupting the flow of liquids through said first and second zones, transferring the function of said first zone to a third zone also containing a solid cuprous halide reagent while transferring the function of said second zone to said first zone, removing fluids from the second zone, decomposing the cuprous halide-diolefin complex in said second zone to deposit cuprous halide therein and recover substantially pure diolefins therefrom, and finally returning said second zone to service in the indicated sequence of operations.

13. In a process for the production of butadiene by the step-wise conversion of normal butane wherein a first conversion stage produces a substantial proportion of normal butenes and a second conversion stage produces a substantial proportion of butadiene from the product of said first stage, the method of continuously separating and recovering butadiene which comprises passing a liquid hydrocarbon product from said first stage comprising butenes at a suitable subatmospheric temperature through a first reagent zone containing solid cuprous chloride reagent to form a solution of cuprous chloride in the liquid hydrocarbon, injecting the solution at the inlet of a second reagent zone into a cooled concurrent stream of a liquid hydrocarbon product from said second stage containing butadiene whereupon reaction between butadiene and cuprous chloride forms a solid addition complex which is removed from the hydrocarbon liquid and retained on solid cuprous chloride reagent in said second reagent zone, passing the liquid effluent after treatment to remove inorganic residues to said second conversion stage for further production of butadiene, subsequently interrupting the flow of hydrocarbon liquids through said first and second reagent zones, transferring the function of said second reagent zone to said first reagent zone while the function of said first reagent zone is continued by a third reagent zone containing solid cuprous chloride reagent from which butadiene has been previously recovered, removing hydrocarbon fluid from said second reagent zone and heating said reagent to temperatures above about 140° F. to release the butadiene which is recovered in substantially pure form, and finally returning the second reagent zone to service in the indicated sequence of operations.

14. In the process of claim 13, the method described in which the liquid effluent following the separation of the butadiene complex is divided, with part being returned to the stream of liquid product from the first conversion stage and part being taken as feed to the second conversion stage.

15. In a process for the production of butadiene by the step-wise catalytic dehydrogenation of normal butane wherein a first dehydrogenation stage produces normal butenes from normal butane and a second dehydrogenation stage produces butadiene from the normal butenes from the first stage, the cyclic method of separating and recovering butadiene which comprises passing a liquid hydrocarbon product from said first stage comprising butenes at a temperature below about 60° F. through a first reagent zone containing a solid cuprous chloride reagent to form a solution of cuprous chloride, injecting the solution at the inlet of a second reagent zone into a cooled concurrent stream of a liquid hydrocarbon product from said second stage containing butadiene whereupon butadiene and cuprous chloride form at a temperature below about 60° F. a solid addition complex which is removed from the hydrocarbon liquid and retained on a solid reagent within said second reagent zone, flowing the liquid effluent, after treatment to remove inorganic residues, to said second dehydrogenation stage, subsequently interrupting the flow of liquids through said first and second reagent zones, replacing the second reagent zone with said first reagent zone while the said first reagent zone is replaced by a third reagent zone containing solid cuprous chloride reagent, removing hydrocarbon fluid from said second reagent zone and heating the butadiene-cuprous chloride addition complex to a temperature sufficient to release and recover substantially pure butadiene, and returning the said second reagent zone to service.

16. In the process of claim 15, the method described in which the liquid hydrocarbon product from the first dehydrogenation stage is treated so as to comprise a substantial proportion of butene-1.

17. In the process of claim 15, the method described in which the liquid hydrocarbon product from the first dehydrogenation stage also contains a minor proportion of butadiene, said butadiene being deposited during the first period of the cycle of operations in the first reagent zone as an insoluble cuprous chloride-butadiene complex, remaining therein during the second period of the cycle of operations while butadiene from the second stage dehydrogenation is being deposited therein as a cuprous chloride-butadiene complex, and being recovered therefrom during the third period of the cycle of operations along with the butadiene from said second dehydrogenation stage by heating of said first reagent zone.

WALTER A. SCHULZE.
LLOYD C. MORRIS.